Patented July 19, 1949

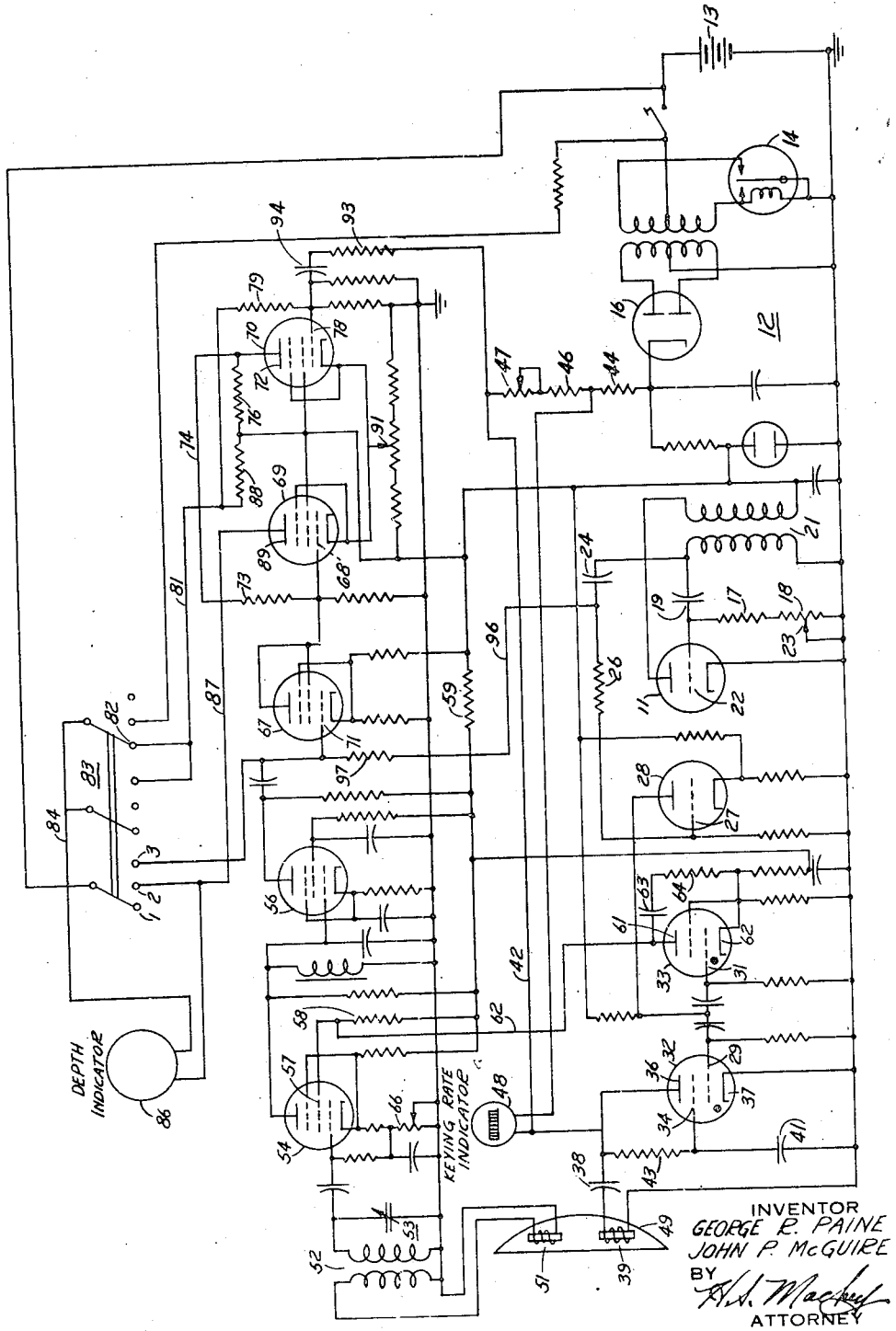

2,476,902

UNITED STATES PATENT OFFICE 2,476,902

DEPTH SOUNDER

George R. Paine, Pleasantville, and John P. McGuire, Amityville, N. Y., assignors to General Precision Laboratory Incorporated, a corporation of New York Application June 10, 1948, Serial No. 32,166

14 Claims. (Cl. 177—386)

1

This invention relates to pulse type depth sounders wherein the time intervals between the transmission of impulses and the reception of the echoes thereof reflected from the bottom are measured and averaged to provide an indication of the depth of water under a ship's hull. Specifically the invention relates to an improvement for such systems whereby false and erroneous depth indications are prevented.

In instruments of this type as they have heretofore been constructed, successive and periodic pulses have been generated and transmitted, each such pulse constituting the beginning of a time measuring interval which is terminated when the echo of a transmitted pulse is received. A new time interval is initiated at the instant of transmission of a next succeeding generated pulse.

Various instrumentalities are used to measure these time intervals as averaging meters, flashing light and rotating scale combination and the like as is well known to those skilled in the art. Inasmuch as time intervals are measured which correspond to the time required for a pulse to be projected from the vessel to the bottom and reflected back thereto it is important that the reflection or echo which acts to terminate the time interval should be the echo of the same pulse that initiated that time period.

In the devices of this nature heretofore devised the periodicity of transmitted pulses has been made such that an echo would be received prior to the transmission of a succeeding pulse at all times up to the maximum depth desired to be measured and at the same time it has been assumed that if the depth of the water was over this maximum so that an echo would not be received until after a succeeding pulse had been generated and projected, the signal strength of the echo would be so weak as to be ineffective as a means to terminate a time interval. For example, if it were desired to measure depths up to a maximum of 200 feet, the generated pulses would have a recurrence rate of 12 per second so that .0833 second would elapse from the generation of one pulse to the next, the velocity of sound in water being approximately 4800 feet per second and any pulse of course, having to travel twice the distance of the depth of the water.

If all bottoms reflected signals with equal intensity it would be a simple matter to adjust the gain of the receiving means so that signals which were reflected for greater than the maximum depth to be measured and which were more attenuated by having traveled over a greater distance would not be amplified sufficiently to affect the measuring means. Under such circumstances either an echo of sufficient strength to operate the time interval measuring means would be received during the proper time interval or not at all.

Various tests and experiments, however, have indicated that bottoms have widely different reflecting properties and that dependence on adjustment of gain as heretofore been practiced cannot assure that signals will always be received from the maximum depth and at the same time assure that no signals of sufficient strength will be received from depths over the maximum for which the apparatus is designed. For example, it has been determined that when the instrument has been adjusted so that the poorest bottom will reflect signals of sufficient strength to actuate the apparatus from a depth of 200 feet, a better bottom will reflect signals of equal strength from greater depths, for example, 800 feet.

Since the gain of the instrument must be such that regardless of the poorest reflecting properties, sufficient gain must be had so that depths up to the maximum will always be indicated, it therefore follows that false signals will be obtained when the bottoms are better than the poorest expected. Consider, for instance, a case where the instrument has been designed to measure depths to a maximum of 200 feet so that the transmission pulses occur at time intervals corresponding to that depth but that the vessel is in water at a depth of 300 feet and over a bottom having reflecting properties such that the echoes received therefrom have sufficient signal intensity to actuate the instrument. The first pulse is transmitted initiating a time measuring interval but no echo is received during the interval corresponding to a depth of 200 feet after which a second pulse is transmitted which initiates a new time interval. At a time corresponding to a depth of 100 feet after the transmission of the second pulse the echo of the first pulse is returned terminating the time interval initiated by the second pulse and this action continues so that the echo pulse which terminates the time interval is derived from a pulse transmitted prior in time to the transmitted pulse which initiated that timed interval. Since depth is determined by the length of duration of the time interval an erroneous indication in the case given of 100 feet is observed.

In the instant invention these false indications of depth are inhibited by modifying the apparatus so that while pulses are generated at time intervals corresponding to the maximum depth to be measured only certain of these pulses are transmitted at such spaced time intervals that in no case can an echo be received with sufficient strength to actuate the time measuring means which is not the product of the last signal pulse transmitted. At the same time apparatus is provided so that if no echo is previously received the time interval initiated by a transmitted pulse is terminated by the next succeeding generated but not transmitted pulse so that the time interval during which measurement can occur corresponds to the maximum depth to be measured. In other words, the time intervals during which actuation can occur are of a time duration corresponding to the maximum depth for which the instrument is designed but are so spaced in time that no such time interval may be terminated by any but the echo which is the proper one for that time interval. For example, pulses may be generated at the rate of 12 per second corresponding to a maximum depth measurement of 200 feet but only every third or fourth of such pulses is transmitted. At the same time unless an echo signal is received the generated pulse immediately succeeding a transmitted pulse inactivates the circuit which then remains inactive until the next pulse is transmitted. Thus there is provided periodic time intervals having a maximum duration of time corresponding to depths of 200 feet but occurring and recurring at time intervals corresponding to depths of 600 or 800 feet.

Of course, those skilled in the art will readily understand that the instrument may be designed for maximum depths greater or less than the example given, the principles being of importance as distinguished from any exact values. In fact the invention is particularly useful in depth finders designed for fishing boats where the maximum depth of interest may be of the order of 20 feet since in such cases it is particularly important to avoid false indications which would appear perfectly plausible even though erroneous. For example, if the last reading noted was 15 feet and the boat proceeded to water having a depth of 25 feet before the indicator was again noted, a false reading of 5 feet such as could be registered on prior devices would seem perfectly reasonable resulting in erroneous deductions and operation.

The exact nature of the invention will be more clearly understood from the following description when taken together with the attached drawing, in which the single figure is a schematic diagram illustrating the principle of the invention when used in depth finders of the type such as described in the copending application of George T. Lorance entitled "Echo sounding indicator," filed March 10, 1945, Serial No. 582,117, now Patent No. 2,446,937, issued August 10, 1948, and the copending application of Fred L. Seebinger entitled "Echo sounding indicator," filed March 10, 1945, Serial No. 582,149, now Patent No. 2,446,960, issued August 10, 1948.

Referring now to the drawing, a blocking oscillator 11 is energized from any desired source 12 here illustrated generally as a battery 13 vibrator 14 and rectifier 16. The blocking oscillator 11 and its associated circuit consisting of resistors 17 and 18 condenser 19 and transformer 21 is so designed that it will normally oscillate at an audio frequency but in endeavoring to oscillate the grid 22 draws current and a high negative bias is developed in resistors 17 and 18 causing the oscillator to block itself. An impulse is transmitted each time this blocking takes place and the rate thereof may be adjusted by adjustment of the movable tap 23 on resistor 18.

The impulses so generated are transmitted through condenser 24 and resistor 26 to the grid 27 of amplifier 28 where they are amplified and transmitted simultaneously to the grids 29 and 31 of gas discharge tubes 32 and 33.

Assuming for the present that the potentials applied to the screen grid 34 and anode 36 of discharge tube 32 are sufficiently high a pulse generated by the blocking oscillator 11, amplified by the amplifier 28 and applied to the grid 29 will fire or ionize the gas in the tube 32 forming a conducting path between the anode 36 and cathode 37 thereby causing the condenser 38 to discharge through the transmitter 39. Transmitter 39 may be of the magnetostriction type and the energization thereof by the sudden discharging of the condenser 38 converts the electrical pulse into sound pressure waves projecting them downwardly towards the bottom.

When the tube 32 is fired the screen grid 34 and anode 36 are reduced in potential to approximately that of ground causing the condenser 41 connected between the screen grid 34 and ground to likewise discharge. Positive potentials for the screen grid 34 and anode 36 are derived from the positive terminal of the power supply 12 through resistors 44, 46 and 47 and conductor 42. After the anode 36 and screen grid 34 are brought to or near ground potential by the firing of the tube 32 a certain time must elapse before the screen grid 34 may regain its operative potential depending on the time constant of the network consisting of the condenser 41 and resistor 43. At the same time that the condenser 41 is recharging through the resistor 43 and the screen grid is approaching the potential of the anode 36 to which it is connected, the anode potential is also increasing due to the charging of the condenser 38 through resistors 44, 46 and 47. This means that the potential applied to the condenser 41 is increasing at the same time it is being recharged and the charging rate and hence the potential of the screen grid increases in a manner more nearly approaching a straight line rather than the exponential rate which would obtain if the condenser were recharged at a fixed potential.

As long as the potential of the screen grid 34 remains below a critical potential while the condenser 41 is recharging, any impulses applied to the grid 29 will have no control over the discharge of the tube 32. The time constant of the network consisting of condenser 41 and resistor 43, therefore, may be so adjusted in relation to the other elements of the system, that the tube 32 will discharge on only every third or fourth pulse generated by the blocking oscillator 11.

The number of pulses generated by the blocking oscillator 11, before the tube 32 is again fired and a pulse transmitted by the transmitter 39 is a matter of choice and design depending on the condition of use of the instrument, the maximum depth which it is designed to measure, etc. However, whether it is the third, fourth or some other pulse generated by the oscillator 11 which fires the tube 32 the more nearly straight line relationship of the charging of condenser 41 assists in this adjustment and makes the selection of values more easily determinable.

The keying rate indicator 48 has five reeds, the center reed being suitably designated and the outer reeds being designated as fast and slow This indicator may be connected as shown to the output of the discharge tube 32 in which event the rate of transmission may be determined by the vibration of a selected reed. That is to say, if the center reed is vibrating it is known that the transmission rate is correct whereas if one of the other reeds is vibrating it is known that the transmission rate is too fast or too slow as the case may be.

The keying rate indicator may also be connected to the output of the blocking oscillator 11 in which event the reeds are designed to vibrate at the faster pulse frequencies generated by the oscillator. In either event if the rate is determined as incorrect an adjustment of the contact 23 on resistor 18 is made until the frequency of pulse generation by the oscillator 11 and hence the slower but dependent frequency of pulse transmission is determined to be correct. The same result being obtained in either manner of operation, namely, the transmission of pulses at accurately spaced time intervals in accordance with the calibration of the apparatus.

After a sound impulse is projected by the transmitter 39 it is projected to the bottom where it is reflected and returned towards the vessel carrying the depth finding apparatus. The reflected sound pulse or echo is received by a receiver 51 which may be a magnetostriction device of the same type as the transmitter 39 and which may be included in the same housing 49 therewith or may be in a separate housing.

The receiver 51 converts the sound pulses to electrical impulses which are transmitted through the transformer 52 and tuned circuit 53 to the input of thermionic tube 54 constituting the first stage of a three stage amplifier circuit. The tuned circuit 53 is tuned to the period of the transmitter 39 as is the coupling network between the first stage 54 and the second stage 56.

The screen grid 57 of tube 54 is connected to the positive terminal of the power supply through resistors 58 and 59 and also to the anode 61 of the gas discharge tube 33 by the conductor 62. The anode 61 is connected to the cathode through condenser 63 and resistor 64.

When the discharge tube 33 is fired by the imposition of a pulse generated by the oscillator 11, condenser 63 discharges through the tube 33 and the resistor 64. At the same time the condenser 63 tends to recharge from the positive side of the supply source through resistor 58 but the time constant of the later circuit is so adjusted with respect to the time constant of the circuit consisting of resistor 64 and condenser 63 that the discharging current exceeds the charging current and the potential of anode 61 is reduced to a point where the tube 33 ceases to fire, the maximum current through the resistor 58 being insufficient to maintain an arc in tube 33.

Since the screen grid 57 of amplifier 54 is connected to the anode 61 of discharge tube 33 the potential of this electrode is reduced a like amount and the gain of the amplifier 54 is momentarily so greatly reduced as to block transmission of signals therethrough. This action insures that the transmitted signal will not be directly transmitted to the receiver and affect the circuit prior to reflection. In other words, the circuit acts as a squelch circuit which momentarily inhibits the operation of the receiver circuit at each instant a pulse is transmitted.

When the tube 33 ceases to fire the condenser 63 is gradually charged through the resistor 58 and the potential applied to the screen grid 57 is gradually returned to its original value, the time being determined by the time constant of the circuit consisting of resistor 58 and condenser 63.

The gradual rise in screen grid potential gradually increases the gain of the amplifier by a proportional amount so that the gain increases with time thereby automatically compensating for the fact that weaker signals are ordinarily received from greater depths.

This means that with increasing depths of water and therefore decreasing strengths of returned echo, the gain is increased and provides compensatory action.

Besides the direct transmission of the transmitted pulse between the transmitter 39 and receiver 51, a certain amount of crosstalk is likely to be caused by electrical coupling between the transmitter and receiver leads, reverberation in the housing carrying the transmitter and receiver and the like. Aside from the squelch circuit above described, therefore, it is necessary to maintain the gain of amplifier 54 below a level which would transmit such crosstalk and which would operate the indicator in such a fashion as to indicate a steady very low depth. This adjustment is provided by the potentiometer 66 connected in the cathode lead of the tube 54 so that the cathode potential may be varied as respects ground. Inasmuch as the gain of the amplifier 54 is determined by the relative potential of the screen grid as respects the cathode an adjustment of the cathode potential will determine the level to which the screen grid potential must rise before the gain of the tube is sufficient to permit signals to be amplified thereby. Because the screen grid potential increases in a time relationship after a signal is transmitted an adjustment of the potentiometer 66 will determine the time interval after transmission when the gain becomes sufficient for signal amplification and this time interval may be adjusted so that all crosstalk signals are below the amplitude which would affect the amplifier 54 during the short period of their existence. In other words, since crosstalk signals die out gradually while the gain of the tube 54 increases gradually, the potentiometer 66 adjusts the gain level and hence the crosstalk threshold of tube 54. In practice an initial regulation of potentiometer 66 for any given installation is all that is usually necessary.

Signals amplified by tube 54 are transmitted to tube 56 where they are further amplified and in turn transmitted to tube 67. Tube 67 is biased beyond cutoff, so that any extraneous noises will not give false depth indications as several volts of signal are required for operation of this tube. The anode potential of tube 67 is the same as respects ground as the potential impressed on the control grid 68 of tube 69 which together with tube 70 and their associated circuits constitute a timer circuit the operation of which will be described presently. Likewise the control grid 71 of tube 67 is connected through a resistance 97 and conductor 96 to the circuit of the blocking oscillator for purposes which will also be described hereinafter.

Turning now to the timer circuit comprising tubes 69 and 70, these tubes have their control grids and plates interconnected to form an Eccles-Jordan trigger circuit so that when one tube is operative the other is made inoperative and vice versa. That is to say, the control grid 68 of tube 69 is connected to the anode 72 of tube 70 through the resistor 73 and lead 74 so that when the tube 70 is drawing current the potential drop in resistor 76 connected in circuit with anode 72 so reduces the potential applied to the control grid 68 as to bias tube 69 beyond cutoff. Likewise the control grid 78 of tube 70 is connected to the anode 89 of tube 69 through a circuit which comprises resistor 79, conductor 81, contact 82 of switch 83, conductor 84, meter 86, conductor 87 to anode 89. When, therefore, a potential drop is produced in resistor 88 connected in the anode circuit of tube 69, the grid 78 of tube 70 is biased to cutoff.

It will be noted that the meter 86 is connected in the anode circuit of tube 69 so that during the time that tube 69 is conducting a current flows therethrough. This current flow may be adjusted to a selected steady state by means of the potentiometer 91, the cathodes of tubes 69 and 70 being connected to the movable contact thereof.

Assuming that the system is in the condition that exists immediately prior to the transmission of a sound pulse by the transmitter 39, the tube 70 is conducting and tube 69 is non-conducting so that no current is flowing through the meter 86. Now consider that a pulse is generated by the blocking oscillator 11 and that the potential of the screen grid 34 of the tube 32 has been raised to such a value by the charge accumulated on condenser 41, that the tube may fire. The condenser 38 is discharged by the firing of the tube 32 and a pulse is transmitted at the same time an electrical pulse is transmitted through conductor 42, resistance 93, condenser 94 to the control grid 78 of tube 70 causing a decrease in the anode current of this tube. The potential drop in resistor 76 is decreased increasing the potential of the grid 68 of tube 69 so that this tube starts to conduct which as heretofore described, causes tube 70 to cut off. At the same time the anode and screen grid of tube 67 are raised to the potential of the control grid 68 of tube 69 so that when a signal is impressed on the control grid 71 of tube 67 which is of sufficient strength to overcome the normal blocking bias, the signal may be transmitted to the control grid of tube 69. As long as the tube 69 conducts a steady current of a preselected value flows through the meter 86 which is damped to record the average current flowing therethrough over a period of time.

Assume now that the echo of the transmitted pulse is received by the receiving element 51 prior to the generation of the next pulse by the blocking oscillator 11. This pulse is amplified by stages 54 and 56, overcomes the normal blocking bias of stage 67, is amplified thereby and impressed on the control grid 68 of tube 69. The pulse causes a reduction in the anode current of this tube which in turn causes tube 70 to again conduct and tube 69 is cut off by the action of the trigger circuit comprising these tubes. The ratio of the length of time that tube 69 is conducting as respects a fixed interval determined by the frequency of signals generated by the oscillator 11, as will be more fully apparent hereinafter, is dependent on the time required for a transmitted pulse to be reflected and received which is a measure of the depth of the water. The time duration of conductivity, however, also determines the average current flow through the meter 86 so that this meter may indicate depth directly.

Assume now, however, that the water is above the maximum depth for which the instrument is designed, that is, that no echo is received during the interval between the generation of a pulse by the oscillator 11 which causes the tube 32 to fire and the generation of a next succeeding pulse by the oscillator 11. The generation of the next succeeding pulse does not cause the tube 32 to fire and a pulse to be transmitted because the condenser 41 has not recharged to a sufficient extent due to the time delay characteristics of the circuit including the condenser 41 and resistor 43, to permit the imposition of sufficient potential on the screen grid 34. The pulse generated by the oscillator 11, however, is also transmitted over a path which includes the condenser 24, conductor 96 and resistor 97 to the control grid 71 of the tube 67. This pulse is transmitted through the tube and impressed on the grid 68 of trigger tube 69, which is in conductive condition. This pulse acts in the same manner as an echo signal previously described, causing the tube 69 to become nonconductive and the tube 70 to conduct. At the same time since tube 70 becomes conductive the potential of grid 68 of tube 69 is greatly reduced in potential which also greatly reduces the potential of the screen grid and anode of tube 67 which are connected thereto. The potentials of these elements are so greatly reduced by this action that no signal can be transmitted through the tube 67 to affect the trigger circuit consisting of tubes 69 and 70 until such time that the tube 69 is again made conductive and the tube 70 non-conductive, i. e., at the time of the firing of tube 32 and the transmission of a pulse by the transmitter 39. There is then an interval of time extending from the generation of a pulse by oscillator 11 which succeeds the generation of the pulse which caused tube 32 to fire until the generation of the next pulse which causes tube 32 to fire; in which no signals may affect the trigger circuit, either unwanted echo signals or pulses generated by the oscillator which are pulses other than the pulse succeeding the firing pulse.

The path by which pulses are applied to the tube 70 to cause this tube to cease to conduct and tube 69 to conduct is somewhat longer and involves more indirect action than the path by which the pulses are applied from the oscillator 11 to the grid 71 of the tube 67 which tends to produce a reverse switch action of the tubes 69 and 70. Thus, while the pulse generated by the oscillator 11 which produces a transmitted pulse results in application of pulses to the grid 71 of the tube 67 and the grid 78 of the tube 70 at nearly the same time no interference occurs since the pulse applied to the grid has ceased to be effective before the tubes 69 and 70 are switched by the application of the pulse to the grid 78.

As heretofore described, the time constants of the circuit including the condenser 41 and resistor 43 may be so adjusted that the tube 32 fires on only, say every fourth pulse generated by the oscillator 11. The receiver and timer circuits, therefore, are in condition to receive echo pulses only during the first quarter of the interval between pulse transmissions and are inoperative to receive any echo pulse that might occasion false depth reading during the remaining three-quarters of the time. The timing of the oscillator 11 is adjusted so that the time interval between generated pulses corresponds to the maximum depth for which measurement is desired while the time constants of the circuit of gas discharge tube 32 are adjusted so that this tube will not fire on a pulse generated by the oscillator 11 until such time as it is assured that no echo of a preceding transmitted pulse may be returned to the receiver with sufficient strength for actuation of the indicator circuit.

Under these conditions the gain of the receiver circuit may be so adjusted that signals returned from bottoms having the poorest reflective properties will have sufficient strength to actuate the indicator circuit in depths up to the maximum and at the same time the periodicity of firing of the tube 32 and the transmission of pulses as respects the period of generation of pulses by the oscillator 11 may be so adjusted that no echo signal received from greater than the maximum depth may actuate the indicator circuit even though the bottom has the best reflective properties.

As an example, the period of the oscillator might be adjusted to measure depths to a maximum of 20 feet and the delay circuit of the tube 32 adjusted so that this tube fires on only every fourth pulse. In such a case all signals from depths of 20 feet or less would operate to provide depth indications but no signal regardless of the conditions could effect a depth indication in depths of 20 to 80 feet. Of course, depths of over 80 feet might supply echoes but it is assumed in this example that such depths are so great that under even the best conditions the signal energy level of such signals is insufficient to override the normally negative bias of the tube 67 to operate the timer and indicating circuits.

Switch 83 is a three position switch of the spring return type normally in the position 1 or depth indicating position as illustrated. In position 2 or battery position, the charge of the battery 13 may be checked on the meter 86 and in position 3 or calibrating position, the potentiometer 91 may be adjusted to regulate the current flow through trigger tube 69 when it is conducting, an indicia mark being provided on the meter to which the pointer may be aligned for this purpose. This adjustment should be accurately made since as indicated heretofore, the average current flowing in the tube 69 over a period of time provides the means for indicating depth on the meter 86 and hence it is essential that during those periods of time that such current does flow that it be an exact predetermined amount in order that the relative lengths of time of current flow and cessation of flow may be accurately determined by the average current indication.

While the invention comprising instrumentalities whereby any echo received from depths up to a maximum provide true indications of such depth and all echoes from depths in excess thereof are prevented from providing false indications regardless of circumstances has been described in connection with a particular depth finder circuit it will be apparent to those skilled in the art that the inventive concepts may be as readily applied to other depth finding circuit arrangements.

What is claimed is:

1. A depth sounder comprising, a pulse generator generating pulses at periodically recurring intervals, a transmitter, means for energizing said transmitter in timed relation with only selected ones of said generated pulses whereby transmitted pulses are projected by said transmitter at periodically recurring intervals proportional to but greater than the periodically recurring intervals of said generated pulses, a receiver for receiving each transmitted pulse projected by said transmitter and reflected from the bottom of the medium sounded, a depth indicator operatively associated with said receiver and means operative by a generated pulse immediately succeeding a selected generated pulse with which said transmitter is energized in timed relation for inhibiting the operation of said depth indicator, whereby reflected pulses received during the interval occurring between the generation of a succeeding pulse and the projection of a transmitted pulse are ineffective to actuate said indicator.

2. A depth sounder comprising, means for electronically generating pulses at periodically recurring intervals, a gas filled discharge tube having its input connected for the impression of said electronically generated pulses thereon, a transmitter and a condenser connected in series in the output circuit of said gas filled discharge tube whereby the firing of said tube discharges said condenser through said tube and transmitter resulting in the transmission of a pulse by said transmitter, means for reducing the potential applied to an electrode of said gas filled tube at the instant of firing thereof and for gradually increasing said potential to its original value over a selected interval of time after the instant of firing of said tube whereby only certain of said electronically generated pulses result in the firing of said gas filled discharge tube and the transmission of a pulse, an echo sounding receiver circuit connected to receive and amplify reflected pulses transmitted by said transmitter, a depth indicator actuated thereby, and means operative by an electronically generated pulse immediately succeeding an electronically generated pulse which results in the firing of said gas filled tube for inhibiting the operation of said depth indicator whereby reflected pulses received during the interval occurring between the generation of a succeeding pulse and the projection of the subsequent transmission of a pulse are ineffective to actuate said indicator.

3. A depth sounder comprising, a blocking oscillator for generating pulses at a fixed rate, a gas filled discharge tube having at least an anode, cathode, control grid and second grid electrode, a circuit for impressing the pulses generated by said blocking oscillator on said control grid, a transmitter and a condenser connected in series in the anode circuit of said gas filled discharge tube whereby the firing of said gas filled discharge tube discharges said condenser through said tube and said transmitter resulting in the transmission of a pulse by said transmitter, a source of potential for said second grid electrode, means for reducing the potential applied thereto at the instant of firing of said gas filled tube and for gradually returning said potential to its original value over a selected interval of time, whereby only certain of the pulses generated by said blocking oscillator result in the firing of said gas filled discharge tube and the transmission of a pulse, an echo sounding receiver circuit connected to receive and amplify reflected pulses transmitted by said transmitter, a depth indicator actuated thereby and means for inhibiting the operation of said indicator during a selected portion of the interval between transmitted pulses.

4. A depth sounder according to claim 3 in which the means for inhibiting the operation of the indicator is operated by the blocking oscillator.

5. A depth sounder comprising, a blocking oscillator for generating pulses at a fixed rate, a gas filled discharge tube having at least an anode, cathode, control grid and second grid electrode, a circuit for impressing the pulses generated by said blocking oscillator on said control grid, a transmitter and a condenser connected in series in the anode circuit of said gas filled discharge tube whereby the firing of said gas filled discharge tube discharges said condenser through said tube and said transmitter resulting in the transmission of a pulse by said transmitter, a condenser connected between said cathode and said second grid electrode, a resistor in series therewith connected between said second grid electrode and a source of positive potential whereby the firing of said gas filled discharge tube discharges said last mentioned condenser therethrough and the potential applied to said second grid electrode is gradually returned to its original value over an interval of time determined by the time delay characteristics of said resistor condenser combination and only certain of the pulses generated by said blocking oscillator result in the firing of said gas filled discharge tube and the transmission of a pulse, an echo sounding receiver circuit connected to receive and amplify reflected pulses transmitted by said transmitter, a depth indicator actuated thereby and means for inhibiting the operation of said indicator during a selected portion of the interval between transmitted pulses.

6. A depth sounder in accordance with claim 5 in which said second grid electrode is additionally connected to said anode through said resistor.

7. A depth sounder comprising, a pulse generator generating pulses at periodically recurring intervals, a transmitter, means for energizing said transmitter in timed relation with only selected ones of said generated pulses whereby transmitted pulses are projected by said transmitter at periodically recurring intervals proportional to but greater than the periodically recurring intervals of said generated pulses, an echo sounding receiver connected to receive echoes of the transmitted pulses, trigger means including a pair of grid-controlled devices having their grid and anode electrodes interconnected through a network of resistors to provide a circuit in which only one of said devices is conductive at a time, a coupling circuit connecting the transmitter to the input circuit of the first of said pair of grid-controlled devices, a coupling circuit connecting the receiver to the input circuit of the second of said pair of grid-controlled devices, said last mentioned coupling circuit including a discharge tube, means for rendering said discharge tube inoperative during the period said first grid-controlled device is conductive, means for impressing said generated pulses on the input circuit of said discharge tube whereby if no echo pulse is received in the interval between a transmitted pulse and the next succeeding pulse generated by said pulse generator, said succeeding pulse is transmitted through said discharge tube operating said trigger means to render said discharge tube inoperative for the transmission of signals therethrough until said trigger circuit is reset by the transmission of another pulse and depth indicating means coupled to said discharge tube.

8. A depth sounder comprising, a pulse generator generating pulses at periodically recurring intervals, a transmitter means for energizing said transmitter in timed relation with only selected ones of said generated pulses whereby transmitted pulses are projected by said transmitter at periodically recurring intervals proportional to but greater than the periodically recurring intervals of said generated pulses, an echo sounding receiver connected to receive echoes of the transmitted pulses, trigger means including a pair of grid-controlled devices having their grid and anode electrodes interconnected through a network of resistors to provide a circuit in which only one of said devices is conductive at a time, a coupling circuit connecting the transmitter to the input circuit of the first of said pair of grid-controlled devices, a coupling circuit connecting the receiver to the input circuit of the second of said pair of grid-controlled devices, said last mentioned coupling circuit including a discharge tube, a connection between the anode of said discharge tube and the anode circuit of said first of said pair of grid-controlled devices whereby when said first grid-controlled device is conductive the anode potential of said discharge tube is reduced to such an extent that the tube is inoperative to transmit signals, circuit means impressing said generated pulses on the input circuit of said discharge tube whereby if no echo signal is received in the interval between a transmitted pulse and the next succeeding pulse generated by said pulse generator, said succeeding pulse is transmitted through said discharge tube causing said first grid-controlled device to conduct and render said discharge tube inoperative for the transmission of signals until said trigger circuit is reset by the impression thereon of the next succeeding transmitted pulse and depth indicating means coupled to said discharge tube.

9. A depth sounder comprising, a blocking oscillator for generating pulses at a fixed rate, a gas filled discharge tube having at least an anode, cathode, control grid and second grid electrode, a circuit for impressing the pulses generated by said blocking oscillator on said control grid, a transmitter and a condenser connected in series in the anode circuit of said gas filled discharge tube whereby the firing of said gas filled discharge tube discharges said condenser through said tube and said transmitter resulting in the transmission of a pulse thereby, a source of potential for said second grid electrode, means for reducing the potential applied thereto at the instant of firing of said gas filled tube and for gradually returning said potential to its original value over a selected interval of time, whereby only certain of the pulses generated by said blocking oscillator result in the firing of said gas filled discharge tube and the transmission of a pulse, an echo sounding receiver connected to receive echoes of the transmitted pulses, trigger means including a pair of grid-controlled devices having their grid and anode electrodes interconnected through a network of resistors to provide a circuit in which only one of said devices is conductive at a time, a coupling circuit connecting the anode circuit of said gas filled discharge tube to the first of said pair of grid-controlled devices, a coupling circuit connecting the receiver to the input circuit of the second of said pair of grid-controlled devices, said last mentioned coupling circuit including a discharge tube, means for rendering said discharge tube inoperative during the period said first grid-controlled device is conductive, a circuit for impressing the pulses generated by said blocking oscillator on the input circuit of said discharge tube whereby if no echo pulse is received in the interval of time between a transmitted pulse and the next succeeding pulse generated by said blocking oscillator, said succeeding pulse is transmitted through said discharge tube operating said trigger means to render said discharge tube inoperative for the transmission of signals therethrough until the trigger circuit is reset by the transmission of another pulse and depth indicating means coupled to said discharge tube.

10. A depth sounder comprising, a blocking oscillator for generating pulses at a fixed rate, a gas filled discharge tube having at least an anode, cathode, control grid and second grid electrode, a circuit for impressing the pulses generated by said blocking oscillator on said control grid, a transmitter and a condenser connected in series in the anode circuit of said gas filled discharge tube whereby the firing of said gas filled discharge tube discharges said condenser through said tube and said transmitter resulting in the transmission of a pulse thereby, a source of potential for said second grid electrode, means for reducing the potential applied thereto at the instant of firing of said gas filled tube and for gradually returning said potential to its original value over a selected interval of time, whereby only certain of the pulses generated by said blocking oscillator result in the firing of said gas filled discharge tube and the transmission of a pulse, an echo sounding receiver connected to receive echoes of the transmitted pulses, trigger means including a pair of grid-controlled devices having their grid and anode electrodes interconnected through a network of resistors to provide a circuit in which only one of said devices is conductive at a time, a coupling circuit connecting the anode circuit of said gas filled discharge tube to the first of said pair of grid-controlled devices, a coupling circuit connecting the receiver to the input circuit of the second of said pair of grid-controlled devices, said last mentioned coupling circuit including a discharge tube, a connection between the anode of said discharge tube and the anode circuit of said first of said pair of grid-controlled devices whereby when said first grid-controlled device is conductive the anode potential of said discharge tube is reduced to such an extent that the tube is inoperative to transmit signals, a circuit for impressing the pulses generated by said blocking oscillator on the input circuit of said discharge tube whereby if no echo signal is received in the interval between a transmitted pulse and the next succeeding pulse generated by said blocking oscillator, said succeeding pulse is transmitted through said discharge tube causing said first grid-controlled device to conduct and render said discharge tube inoperative for the transmission of signals until said trigger circuit is reset by the impression thereon of the next succeeding transmitted pulse, and depth indicating means coupled to said discharge tube.

11. A depth sounder comprising, a blocking oscillator for generating pulses at a fixed rate, a gas filled discharge tube having at least an anode, cathode, control grid and second grid electrode, a circuit for impressing the pulses generated by said blocking oscillator on said control grid, a transmitter and a condenser connected in series in the anode circuit of said gas filled discharge tube whereby the firing of said gas filled discharge tube discharges said condenser through said tube and said transmitter resulting in the transmission of a pulse by said transmitter, a condenser connected between said cathode and said second grid electrode, a resistor in series therewith connected between said second grid electrode and a source of positive potential whereby the firing of said gas filled discharge tube discharges said last mentioned condenser therethrough reducing the potential applied to said second grid electrode and gradually returning it to its original value over an interval of time determined by the delay characteristics of said resistor condenser combination so that only certain of the pulses generated by said blocking oscillator result in the firing of said gas filled discharge tube and the transmission of a pulse, an echo sounding receiver connected to receive echoes of the transmitted pulses, trigger means including a pair of grid-controlled devices having their grid and anode electrodes interconnected through a network of resistors to provide a circuit in which only one of said devices is conductive at a time, a coupling circuit connecting the anode circuit of said gas filled discharge tube to the first of said pair of grid-controlled devices, a coupling circuit connecting the receiver to the input circuit of the second of said pair of grid-controlled devices, said last mentioned coupling circuit including a discharge tube, means for rendering said discharge tube inoperative during the period said first grid-controlled device is conductive, a circuit for impressing the pulses generated by said blocking oscillator on the input circuit of said discharge tube whereby if no echo pulse is received in the interval of time between a transmitted pulse and the next succeeding pulse generated by said blocking oscillator, said succeeding pulse is transmitted through said discharge tube operating said trigger means to render said discharge tube inoperative for the transmission of signals therethrough until the trigger circuit is reset by the transmission of another pulse and depth indicating means coupled to said discharge tube.

12. A depth sounder comprising, a blocking oscillator for generating pulses at a fixed rate, a gas filled discharge tube having at least an anode, cathode, control grid and second grid electrode, a circuit for impressing the pulses generated by said blocking oscillator on said control grid, a transmitter and a condenser connected in series in the anode circuit of said gas filled discharge tube whereby the firing of said gas filled discharge tube discharges said condenser through said tube and said transmitter resulting in the transmission of a pulse by said transmitter, a condenser connected between said cathode and said second grid electrode, a resistor in series therewith connected between said second grid electrode and a source of positive potential whereby the firing of said gas filled discharge tube discharges said last mentioned condenser therethrough reducing the potential applied to said second grid electrode and gradually returning it to its original value over an interval of time determined by the delay characteristics of said resistor condenser combination so that only certain of the pulses generated by said blocking oscillator result in the firing of said gas filled discharge tube and the transmission of a pulse, an echo sounding receiver connected to receive echoes of the transmitted pulses, trigger means including a pair of grid-controlled devices having their grid and anode electrodes interconnected through a network of resistors to provide a circuit in which only one of said devices is conductive at a time, a coupling circuit connecting the anode circuit of said gas filled discharge tube to the first of said pair of grid-controlled devices, a coupling circuit connecting the receiver to the input circuit of the second of said pair of grid-controlled devices, said last mentioned coupling circuit including a discharge tube, a connection between the anode of said discharge tube and the anode circuit of said first of said pair of grid-controlled devices whereby when said first grid-controlled device is conductive the anode potential of said discharge tube is reduced to such an extent that the tube is inoperative to transmit signals, a circuit for impressing the pulses generated by said blocking oscillator on the input circuit of said discharge tube whereby if no echo signal is received in the interval between a transmitted pulse and the next succeeding pulse generated by said blocking oscillator, said succeeding pulse is transmitted through said discharge tube causing said first grid-controlled device to conduct and render said discharge tube inoperative for the transmission of signals until said trigger circuit is reset by the impression thereon of the next succeeding transmitted pulse, and depth indicating means coupled to said discharge tube.

13. The method of depth sounding which comprises electronically generating pulses at periodically recurring intervals, transmitting pulses in timed relation with only certain of said generated pulses recurring at regular intervals, receiving echoes of said pulses and indicating depth by only those echoes which are received in an interval of time extending from the transmission of a pulse until the generation of the next succeeding pulse.

14. In a depth sounder having a transmitter and a receiving circuit the method of operation which comprises generating pulses at periodically recurring intervals, transmitting pulses in timed relation with only certain of said generated pulses recurring at regular intervals, blocking said receiver circuit for the reception of echoes which occur during intervals between the generation of a pulse next succeeding a transmitted pulse and a succeeding transmitted pulse and indicating depth by only those echoes during the period the receiver circuit is operative.

GEORGE R. PAINE.
JOHN P. McGUIRE.

REFERENCES CITED

The following references are of record in the file of this patent:

UNITED STATES PATENTS

| Number | Name | Date |
| --- | --- | --- |
| 2,346,093 | Tolson | Apr. 4, 1944 |

FOREIGN PATENTS

| Number | Country | Date |
| --- | --- | --- |
| 552,072 | Great Britain | Mar. 22, 1943 |